(12) United States Patent
Ploemen et al.

(10) Patent No.: US 8,728,306 B2
(45) Date of Patent: May 20, 2014

(54) METHOD FOR EXTRACTING BITUMEN FROM AN OIL SAND FEED STREAM

(75) Inventors: Ingmar Hubertus Josephina Ploemen, Amsterdam (NL); Ronald Jan Schoonebeek, Amsterdam (NL); Bernardus Cornelis Maria In't Veen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 255 days.

(21) Appl. No.: 13/424,538

(22) Filed: Mar. 20, 2012

(65) Prior Publication Data

US 2013/0068665 A1 Mar. 21, 2013

(30) Foreign Application Priority Data

Mar. 21, 2011 (CA) ...................................... 2734451

(51) Int. Cl.
*C10G 1/04* (2006.01)
(52) U.S. Cl.
USPC .......................................................... 208/390

(58) Field of Classification Search
CPC .......................................................... C10G 1/04
USPC .......................................................... 208/390
See application file for complete search history.

(56) References Cited

U.S. PATENT DOCUMENTS

| 3,475,318 A | 10/1969 | Gable et al. ...................... 208/11 |
| 2008/0210602 A1* | 9/2008 | Duyvesteyn ................... 208/390 |
| 2009/0301937 A1 | 12/2009 | Duyvesteyn et al. ......... 208/390 |

* cited by examiner

*Primary Examiner* — Brian McCaig

(57) ABSTRACT

A method for extracting bitumen from an oil sand feed stream comprises at least the steps of: (a) providing an oil sand feed stream; (b) contacting the oil sand feed stream with a liquid comprising an aliphatic hydrocarbon solvent thereby obtaining a solvent-diluted oil sand slurry; (c) filtering the solvent-diluted oil sand slurry, thereby obtaining a first bitumen-enriched filtrate, a second bitumen-depleted filtrate and a bitumen-depleted sand; (d) reusing the second filtrate obtained in step (c) in the contacting of step (b); and (e) removing solvent from the first bitumen-enriched filtrate thereby obtaining a bitumen-enriched stream.

12 Claims, 1 Drawing Sheet

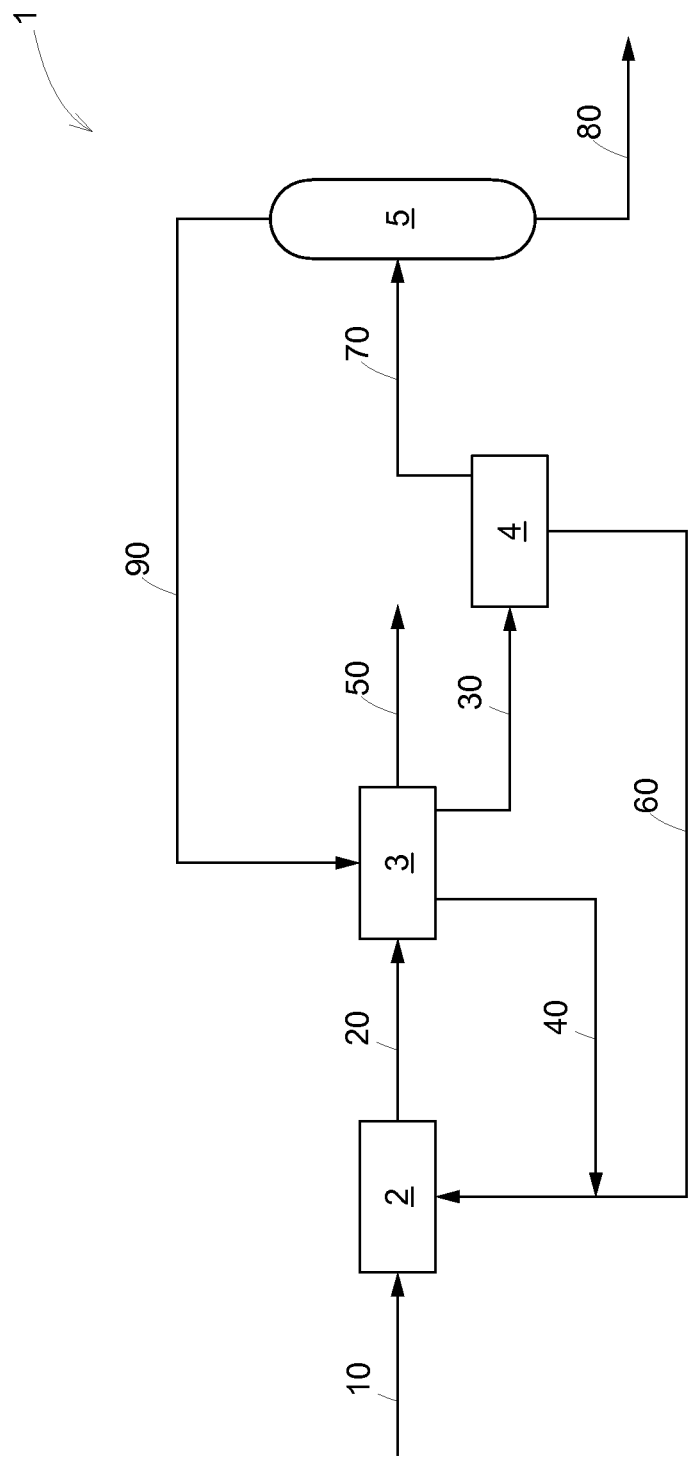

METHOD FOR EXTRACTING BITUMEN FROM AN OIL SAND FEED STREAM

CROSS REFERENCE TO EARLIER APPLICATIONS

The present application claims priority to Canadian application No. 2734451, filed on 21 Mar. 2011, which is incorporated herein by reference.

FIELD OF THE INVENTION

The present invention relates to a method for extracting bitumen from an oil sand.

BACKGROUND OF THE INVENTION

Various methods have been proposed in the past for the recovery of bitumen (sometimes referred to as "tar" or "bituminous material") from oil sands as found in various locations throughout the world and in particular in Canada such as in the Athabasca district in Alberta and in the United States such as in the Utah oil sands. Typically, oil sand (also known as "bituminous sand" or "tar sand") comprises a mixture of bitumen (in this context also known as "crude bitumen", a semi-solid form of crude oil; also known as "extremely heavy crude oil"), sand, clay minerals and water. Usually, oil sand contains about 5 to 25 wt. % bitumen (as meant according to the present invention), about 1 to 13 wt. % water, the remainder being sand and clay minerals.

As an example, it has been proposed and practiced at commercial scale to recover the bitumen content from the oil sand by mixing the oil sand with water and separating the sand from the aqueous phase of the slurry formed. Disadvantages of such aqueous extraction processes are the need for extremely large quantities of process water (typically drawn from natural sources) and issues with removing the bitumen from the aqueous phase (whilst emulsions are being formed) and removing water from the bitumen-depleted sand.

Other methods have proposed non-aqueous extraction processes to reduce the need for large quantities of process water. Example of such a non-aqueous extraction process are disclosed in e.g. U.S. Pat. No. 3,475,318 and US2009/0301937, the teaching of which is hereby incorporated by reference.

U.S. Pat. No. 3,475,318 discloses a process of selectively removing bitumen from oil sands by solvent extraction with subsequent solvent recovery. The extraction solvent contains a saturated hydrocarbon having from 5 to 9 carbon atoms per molecule or mixtures thereof thereby leaving the asphaltenes on the sand. For removal of asphaltenes (to be used as process fuel), an aromatic solvent such as benzene or toluene is used.

US 2009/0301937 discloses a method for preparing solvent-dry, stackable tailings. The method includes a primary extracting process using a first solvent (typically a light aromatic solvent) that separates most of the bitumen from a material comprising bitumen and produces a first solvent-wet tailings. The first solvent-wet tailings are washed with a second solvent (typically an aliphatic solvent) that removes the first solvent from the tailings. The second solvent remaining in the tailings is removed thereby producing solvent-dry, stackable tailings.

SUMMARY OF THE INVENTION

There is a continuous desire to improve the process efficiency in methods for extracting bitumen from an oil sand feed stream. It is an object of the present invention to meet this desire and to provide a more efficient method for extracting bitumen from an oil sand feed stream.

It is a further object of the present invention to provide an alternative non-aqueous solvent based extraction process for extracting bitumen from an oil sand.

One or more of the above or other objects are achieved according to the present invention by providing a method for extracting bitumen from an oil sand feed stream, the method comprising at least the steps of:

(a) providing an oil sand feed stream;
(b) contacting the oil sand feed stream with a liquid comprising an aliphatic hydrocarbon solvent thereby obtaining a solvent-diluted oil sand slurry;
(c) filtering the solvent-diluted oil sand slurry, thereby obtaining a first bitumen-enriched filtrate, a second bitumen-depleted filtrate and a bitumen-depleted sand;
(d) reusing the second filtrate obtained in step (c) in the contacting of step (b); and
(e) removing solvent from the first bitumen-enriched filtrate thereby obtaining a bitumen-enriched stream.

It has now surprisingly been found according to the present invention that by splitting the filtrate as obtained in the filtering step in two (or more) streams, a relatively thick slurry (to be filtered in step (c)) may be obtained in the contacting step (which usually takes place in a mixer)—without the need of adding a thickener in between the step of contacting (in step (b)) and filtering (in step (c))—thereby resulting in increased efficiency. Filtering a relatively thick slurry (containing e.g. more than 32 vol. % solids) avoids the formation of a supernatant liquid layer above the filter cake, which supernatant liquid layer contains a large proportion of fine particles that may block the filter cake during subsequent filtration.

A further advantage of the present invention is that by separating the filtrate in a first filtrate and a second filtrate, whilst the second filtrate is being recycled (in step (d)) to the contacting step, the solvent recovery process can be performed on the first filtrate only; in this respect it is noted that, as the first filtrate contains less solvent, it is relatively easy to remove the solvent from the first filtrate when compared with removing solvent from the combined first and second filtrates.

Another advantage of the present invention, is that (unlike e.g. U.S. Pat. No. 3,475,318 and US 2009/0301937) a single (non-aqueous) solvent system is being used.

A further advantage is that asphaltenes are selectively left behind in the bitumen-depleted sand.

According to the present invention, the providing of the oil sand can be done in various ways. Typically, before contacting the dry oil sand (which may contain some water being present in the oil sand) with the solvent the oil sand particles are reduced in size, e.g. by crushing, breaking and/or grinding, to below a desired size upper limit. Experience in large scale operations shows that the achievable size upper limit for such size reduction is currently about 8 inch.

The contacting of the oil sand with the liquid comprising a solvent thereby obtaining a solvent-diluted oil sand slurry is not limited in any way, provided that, as at least part of the liquid, the second filtrate as discussed below is used. As an example, the liquid may be added before, during or after the size-reducing step (if available) of the oil sand. Further size reduction in the presence of the liquid (comprising the solvent) may be performed; part of the size reduction may take place by dissolution of bitumen present in the oil sand, but further size reduction e.g. by using screens and/or again crushers, breaker or grinders may be performed, if desired. Typically, the solvent forms the major part of the liquid and is preferably present in an amount of from 50 wt. % up to 100 wt. %, preferably above 60 wt. %, more preferably above 70 wt. %, even more preferably above 80 or even above 90 wt. %, based on the amount of the liquid.

The solvent as used in the method of the present invention may be any saturated or unsaturated aliphatic (i.e. non-aromatic) solvent and may include linear, branched or cyclic alkanes and alkenes and mixtures thereof. Preferably, the solvent in step (b) comprises an aliphatic hydrocarbon having from 3 to 9 carbon atoms per molecule, more preferably from 4 to 7 carbons per molecule, or a combination thereof. Especially suitable solvents are saturated aliphatic hydrocarbons such as propane, butane, pentane, hexane, heptane, octane and nonane (including isomers thereof), in particular butane, pentane, hexane and heptane. It is preferred that the solvent in step (b) comprises at least 90 wt. % of the aliphatic hydrocarbon having from 3 to 9 carbon atoms per molecule, preferably at least 95 wt. %. Also, it is preferred that in step (b) substantially no aromatic solvent (such as toluene or benzene) is present, i.e. less than 5 wt. %, preferably less than 1 wt. %. Herewith, the asphaltene content of the bitumen in the bitumen-depleted sand remains relatively high when compared with the asphaltene content of the bitumen in the original oil sand feed stream.

According to an especially preferred embodiment of the present invention, the particles of the solvent-diluted oil sand slurry obtained in step (b) are screened or reduced in size to have a diameter below 5.0 cm, preferably below 3.0 cm, more preferably below 2.0 cm. As the screening or size reduction is performed in the presence of solvent (rather than size reduction under dry conditions), this helps breaking down the larger particles and dissolving the bitumen thereby avoiding the formation of sticky lumps. Additionally, by mixing the oil sand feed stream with the solvent before performing the filtering (in step (c)), the viscosity of the bitumen present in the oil sand is reduced, which leads to a (desired) increased filtration rate.

Typically, the solvent-diluted oil sand slurry obtained in step (b) has a S/B weight ratio of from 0.5 to 4.0 and more typically above 0.7. Preferably, the solvent-diluted oil sand slurry obtained in step (b) has a S/B weight ratio of from 1.2 to 4.0, preferably from 1.3 to 3.0, more preferably from 1.5 to 2.5. An advantage of the present invention is that by the use of the two (or more) filtrates and hence reducing the amount of bitumen recycled to the contacting step, this relatively high S/B ratio for the solvent-diluted oil sand slurry can be achieved whilst operating at relatively high solids concentration in the solvent-diluted oil sand slurry. This relatively high S/B weight ratio combined with the high solids concentration for the solvent-diluted oil sand slurry results in an increased filtration rate (see Example 2 hereafter) and thereby increased efficiency.

Typically, the solvent-diluted oil sand slurry obtained in step (b) comprises from 25 to 60 vol. % of solids, preferably from 32 to 60 vol. % of solids, more preferably from 35 to 50 vol. %, even more preferably from 40 to 48 vol. %.

After contacting the oil sand with the solvent in step (b), the solvent-diluted oil sand slurry is filtered in step (c), thereby obtaining a first bitumen-enriched filtrate, a second bitumen-depleted filtrate and a bitumen-depleted sand, the first filtrate having a solvent-to-bitumen (S/B) weight ratio of from 0.5 to 5.0, typically above 0.7 and more typically from 1.0 to 5.0, based on the amount of bitumen and solvent in the first filtrate. This filtering step can be performed in many different ways. Although some fresh solvent may be used at the start-up of the process of the present invention, the addition of fresh solvent later on is preferably kept to a minimum; most of the solvent used in the filtration step is recycled from downstream of the process. Also, the splitting of the filtrates in the first and second (and optionally further) filtrates can be performed in various ways. Typically, the first filtrate obtained in step (c) leaves the filter cake earlier than the second filtrate obtained in step (c).

Although the first filtrate obtained in step (c) typically has a solvent-to-bitumen (S/B) weight ratio of from 0.5 to 5.0 and more typically above 0.7, it is preferred that the first filtrate obtained in step (c) has a solvent-to-bitumen (S/B) weight ratio of from 1.0 to 5.0, preferably from 1.2 to 4.0, more preferably from 1.5 to 2.5, based on the amount of bitumen and solvent in the first filtrate.

Further it is preferred that the second filtrate obtained in step (c) has a S/B weight ratio of above 3.0, preferably above 5.0. Typically, the solvent-to-bitumen (S/B) weight ratio of the second filtrate is below 100.0, preferably below 25.0.

After the filtration of step (c), the second filtrate obtained in step (c) is reused in the contacting of step (b).

Subsequently, the solvent from the first bitumen-enriched filtrate is at least partially removed in step (e) thereby obtaining a bitumen-enriched stream.

Preferably, the first filtrate obtained in step (c) is sent to a solid/liquid separator to remove solid particles and fines. "Fines" typically are solid particles having a size below 300 µm, preferably below 200 µm, more preferably below 100 µm.

Also it is preferred that the solvent removed from the first filtrate in step (e) is reused in step (c), as a wash solvent during the filtration step. Preferably, at least part of the solvent removed from the first filtrate in step (e) is removed as vapour; also it is preferred that at least part of the vapour is subsequently condensed in step (c) thereby heating up the solvent-diluted oil sand slurry being filtered. As a result the bitumen-depleted sand is increased in temperature as well, thereby making a subsequent drying step (if any) of the bitumen-depleted sand more efficient.

Furthermore it is preferred that the bitumen-depleted sand stream is dried, thereby obtaining a dried bitumen-depleted sand stream containing less than 500 ppmw, preferably less than 300 ppmw, of the solvent.

BRIEF DESCRIPTION OF THE DRAWINGS

Hereinafter the invention will be further illustrated by the following non-limiting drawing. Herein shows:

FIG. 1 schematically a process scheme of the method in accordance with the present invention.

DETAILED DESCRIPTION OF THE PREFERRED EMBODIMENTS

For the purpose of this description, a single reference number will be assigned to a line as well as a stream carried in that line.

FIG. 1 schematically shows a simplified process scheme according to the present invention for extracting bitumen (i.e. in the context of the invention a bituminous and/or extremely heavy crude oil like material) from an oil sand feed stream. The process scheme is generally referred to with reference numeral 1. The process scheme 1 shows a mixer 2, a filter 3, a first separator 4 and a second separator 5.

During use of the process scheme of FIG. 1, an oil sand feed stream 10 is provided and fed to the mixer 2. Typically, before entering the mixer 2, the dry oil sand feed stream 10 has been crushed or treated otherwise, to reduce the size of the larger oil sand lumps to below a pre-determined upper limit. Experience in large scale operations shows that the achievable size upper limit for such size reduction is currently about 8 inch. Further size reduction of the dry oil sand feed stream 10 by mechanical means usually results in blockage due to the sticky, viscous nature of the oil sand. Further size reduction may take place once solvent used for the bitumen extraction has been added.

In the mixer 2, the dry oil sand feed stream 10 is mixed with solvent stream 40 (containing an aliphatic hydrocarbon solvent and a certain amount of bitumen) recycled from downstream of the process (and with stream 60 which is further discussed below) thereby obtaining a solvent-diluted oil sand slurry 20. Usually, in the mixer 2 (or in a separate unit, if needed), the particles of the solvent-diluted oil sand slurry obtained are reduced in size, typically to have a diameter below 5.0 cm. Any undesired materials (such as rocks and woody material) that may hinder downstream processing may be removed by using screens or the like (preferably in the presence of solvent) and the remaining oil sand particles are reduced in size in the presence of the solvent, e.g. by crushing, breaking and/or grinding.

The slurry stream 20 exiting the mixer 2 is fed into the filter 3 for filtration. Typically, the solvent-diluted oil sand slurry 20 as fed to the filter 3 comprises from (25 or even) 30 to 60 vol. % of solids, preferably from 35 to 50 vol. %. In the embodiment of FIG. 1, in filter 3 a wash solvent is used. The wash solvent has been recycled from a point downstream in the process (stream 90); of course, some additional fresh wash solvent (not shown) may be added as well.

In the filter 3, the solvent-diluted oil sand slurry is filtered, thereby obtaining a first bitumen-enriched filtrate (removed as stream 30), a second bitumen-depleted filtrate (removed as stream 40) and a bitumen-depleted sand stream (removed as stream 50).

In the embodiment of FIG. 1, the first bitumen-enriched filtrate 30 is sent to the first separator 4 (a solid/liquid separator; usually a settler) in order to remove any remaining solid particles and fines (typically below 1 wt. % of the stream 30). The fines (and some solvent-diluted bitumen) are recycled as stream 60 to upstream of the filter 3. In the embodiment of FIG. 1, stream 60 is fed into the mixer 2; alternatively, part or all of stream 60 is combined with stream 20 downstream of the mixer 2. The remainder (containing mainly bitumen and solvent) of stream 30 is sent as stream 70 to the second separator 5 (a liquid/liquid separator). In the second separator 5, stream 70 is separated into an bitumen-enriched stream 80 and a vaporous solvent stream 90. The bitumen-enriched stream 80 is sent to a refinery (not shown) for further processing. The solvent stream 90 is recycled to the filter 3 for re-use as a wash solvent during the filtration step; preferably, at least part (or all) of the vaporous solvent stream 90 is condensed in the filter 3 thereby heating up the solvent-diluted oil sand slurry being filtered. As a result the bitumen-depleted sand stream 50 is increased in temperature as well, thereby making a subsequent drying step (if any) of the bitumen-depleted sand 50 more efficient.

The second bitumen-depleted filtrate 40 is recycled to the mixer 2 (after combining with stream 60). Alternatively, stream 40 is directly fed into mixer 2 or combined with stream 20.

The bitumen-depleted sand stream 50 is usually used for land reclamation. Of course, if needed, further removal of solvent from the bitumen-depleted sand stream 50 may be performed.

Typically the solvent-diluted oil sand slurry 20 to be filtered in filter 3 has a S/B weight ratio of from 0.5 to 5.0; the first filtrate 30 (as well as stream 70) a S/B weight ratio of from 0.5 to 5.0; and the second filtrate 40 a S/B weight ratio of from 5.0 to 100.0.

Typically the contacting step in mixer 2 is executed at about ambient temperatures, preferably at a temperature in the range from 0-40° C., preferably 5-25° C., and at about atmospheric pressure.

The person skilled in the art will readily understand that many modifications may be made without departing from the scope of the invention. As an example, the filter 3 and first separator 4 may be operated at different temperatures, whilst heat exchange between the streams flowing from and to filter 3 and first separator 4 may take place.

The present invention is described below with reference to the following Examples, which are not intended to limit the scope of the present invention in any way.

Example 1

A first 1000 g sample of an Athabasca oil sand (having a bitumen content of 12.3 wt. %; the particles having a diameter below 5.0 cm) and 276 g solvent (n-pentane) were mixed for 30 minutes under ambient conditions using a roll bank (Reax 20, obtainable from Heidolph (Schwabach, Germany); 15 rpm setting) to form a slurry. The slurry was then transferred to a filtration vessel (diameter of the filter was 78 mm), allowed to settle, and the surface of the filter cake levelled (height of the filter cake was about 16 cm). The liquid was pushed through the filter cake until only a thin (1 mm) layer of supernatant liquid remained. 114 g of fresh solvent (g) was added as a wash solvent on top of the filter cake and pushed through the filter cake until only a thin (1 mm) layer of supernatant liquid remained. The filtrate collected was the first filtrate "A" with an S/B weight ratio of 2.4. The time taken for the filtration was 19 seconds. Solvent was removed from the first filtrate "A" to yield crude bitumen product (97 g).

Additional fresh wash solvent (282 g) was then placed on top of the filter cake and pushed through the filter bed under pressure (0.3 bar), until no further liquid was evolved. The time taken for the filtration was 13 seconds. The filtrate so obtained was the second filtrate "B" with an S/B weight ratio of 21.1. Solvent was removed from the second filtrate "B" to yield crude bitumen product (16 g).

Remaining solvent was removed from the sand by purging with nitrogen; the sand was then discarded. Bitumen recovery on the basis of the bitumen present in the first sample was 92%.

A fresh second 963 g sample of the oil sand and the solvent removed from the second filtrate "B" (345 g) were then mixed together using the roll bank for 30 minutes, to form a slurry. The slurry was then transferred to the filtration vessel, allowed to settle, and the surface of the filter cake levelled. The liquid was pushed through the filter cake until only a thin (1 mm) layer of supernatant liquid remained. Fresh wash solvent 117 g was placed on top of the filter cake and pushed through the filter cake until only a thin (1 mm) layer of supernatant liquid remained. The filtrate collected was the first filtrate "C" with an S/B weight ratio of 2.6. The time taken for the filtration was 22 seconds. Solvent was removed from the first filtrate "C" to yield crude bitumen product (106 g).

Additional fresh wash solvent (279 g) was then placed on top of the filter cake and pushed through the filter bed under pressure (0.3 bar), until no further liquid was evolved. The time taken for the filtration was 11 seconds. The filtrate so obtained was the second filtrate "D" with an S/B weight ratio of 19.9. Solvent was removed from the second filtrate "D" to yield crude bitumen product (16.5 g).

Remaining solvent was removed from the sand by purging with nitrogen; the sand was then discarded. Bitumen recovery on the basis of the bitumen present in the second sample was 92%.

Example 2

In order to show the increased efficiency of filtration according to a preferred embodiment of the method according to the present invention wherein a slurry having an increased solids concentration (such as above 32 vol. %) is used, the following comparative experiments were performed. In this respect it is noted that according to the present invention the increased solids concentration of the slurry is obtained by splitting the filtrate in at least two filtrates. Although in this Example 2 the same effect of increased solids concentration for the slurry has been obtained by decantation of the filtrate, it is still illustrative for the effect of the present invention.

A slurry was formed by mixing Athabasca oil sand (having a bitumen content of 11.5 wt. %; the particles having a diameter below 5.0 cm) and solvent (n-pentane) during 30 min in a mixing bottle. In Experiment A (comparison) half of the slurry was directly fed into a filtration vessel (diameter of filter was 50 mm), whilst in Experiment B (according to present invention) the slurry solids concentration was increased by decantation of supernatant liquid (about 95 g decantate) prior to feeding the slurry into the filtration vessel.

Table 1 below shows the results obtained using the above two different filter feeds. The "slurry input" was the amount of sand and solvent as fed into the filtration vessel; some sand and solvent remained in the mixing bottle. The "delta p" was the pressure difference across the filter cake as applied by pressurized nitrogen above the filter cake. "t1" represents the time from beginning of feeding of the slurry until any liquid on top of the filter cake was filtered through the bed and the top surface of the filter cake becomes visible.

TABLE 1

| | Experiment A | Experiment B |
|---|---|---|
| Oil sand [g] | 402 | 400 |
| Solvent [g] | 145 | 144 |
| Slurry input [g] | 541.7 | 440.8 |
| Delta p [bar] | 0.3 | 0.3 |
| t1 [s] | 66 | <5 |
| Decantate [g] | — | 94.7 |
| Slurry solids content [wt. %] | 61.9 | 75.0 |
| Calculated slurry solids content [vol. %] | 30 | 45 |
| S/B | 3.5 | 3.5 |

Example 3

In order to show the effect of S/B ratio (of the slurry) on the filtration time, the following comparative experiments C-E were performed. Although no reuse of filtrate was made (so the these experiments are not performed according to the present invention), these experiments show the effect of S/B ratio on the filtration time (a preferred embodiment of the method according to the present invention makes use of a specific S/B for the slurry, viz. from 0.5 to 5.0, preferably from 1.2 to 4.0, more preferably from 1.3 to 3.0 and even more preferably from 1.5 to 2.5.

Slurries were formed by mixing Athabasca oil sand (having a bitumen content of 11.5 wt. %; the particles having a diameter below 5.0 cm) and solvent (n-pentane) during 30 min. The slurries were fed into a filtration vessel (diameter of filter was 50 mm) and the filtration time was determined. Additional wash solvent was used. Table 2 shows the conditions and results. The "wash time" was the time needed to push the wash solvent through the filter bed.

TABLE 2

| | Experiment C | Experiment D | Experiment E |
|---|---|---|---|
| S/B of slurry | 1.2 | 1.6 | 2.1 |
| Oil sand [g] | 336 | 335 | 336 |
| Solvent [g] | 46.3 | 60.3 | 80 |
| Wash solvent [g] | 56 | 56 | 56 |
| Delta p [bar] | 0.23 | 0.19 | 0.18 |
| Wash time [s] | 13 | 10 | 5 |

DISCUSSION

As can be learned from Example 1 the method according to the present invention provides a process suitable for recovering the majority (more than 90%) of the bitumen present in the oil sand.

Furthermore, Example 2 shows that the filtration according to the present invention resulted in a significantly improved filtration performance. When compared with Experiment A (comparison) where the same slurry was filtered but without decantation of supernatant liquid before feeding into the filtration vessel, the increasing of slurry solids concentration as used in Experiment B (present invention) resulted in a fast filtration (shorter t1). In this respect it is noted that in Experiment A almost complete blockage of the filter occurred, with very long cake formation time and a very low filtration rate.

Example 3 clearly shows that the filtration time (as exemplified by the wash time in Table 2) decreases as the S/B ratio of the slurry increases, as would be expected from the lower liquid viscosity at higher S/B.

We claim:
1. A method for extracting bitumen from an oil sand feed stream, the method comprising at least the steps of:
   (a) providing an oil sand feed stream;
   (b) contacting the oil sand feed stream with a liquid comprising an aliphatic hydrocarbon solvent thereby obtaining a solvent-diluted oil sand slurry;
   (c) filtering the solvent-diluted oil sand slurry, thereby obtaining a first bitumen-enriched filtrate, a second bitumen-depleted filtrate and a bitumen-depleted sand;
   (d) reusing the second filtrate obtained in step (c) in the contacting of step (b); and
   (e) removing solvent from the first bitumen-enriched filtrate thereby obtaining a bitumen-enriched stream.

2. The method according to claim 1, wherein the solvent in step (b) comprises an aliphatic hydrocarbon having from 3 to 9 carbon atoms per molecule.

3. The method according to claim 1, wherein the solvent in step (b) comprises a saturated hydrocarbon.

4. The method according to claim 1, wherein the particles of the solvent-diluted oil sand slurry obtained in step (b) are screened or reduced in size to have a diameter below 5.0 cm.

5. The method according to claim 1 wherein the solvent-diluted oil sand slurry obtained in step (b) has a solvent-to-bitumen (S/B) weight ratio of from 1.2 to 4.0.

6. The method according to claim 1 wherein the solvent-diluted oil sand slurry obtained in step (b) comprises from 32 to 60 vol. % of solids.

7. The method according to claim 1 wherein the first filtrate obtained in step (c) has a S/B weight ratio of from 1.0 to 5.0.

8. The method according to claim 1 wherein the second filtrate obtained in step (c) has a SB weight ratio of above 3.0.

9. The method according to claim 1 wherein the solvent removed from the first filtrate in step (e) is reused in step (c).

10. The method according to claim 9, wherein at least part of the solvent removed from the first filtrate is removed as vapour.

11. The method according to claim 10, wherein at least part of the vapour is condensed in step (c).

12. The method according to claim 1 wherein the bitumen-depleted sand stream is dried, thereby obtaining a dried bitumen-depleted sand stream containing less than 500 ppmw.

* * * * *